United States Patent [19]  [11] 4,351,747
Miyamoto et al.  [45] Sep. 28, 1982

[54] INFORMATION SIGNAL RECORD MEDIUM OF THE CAPACITANCE TYPE

[75] Inventors: Kazumichi Miyamoto, Ichikawa; Akira Nishizawa; Takao Okuda, both of Yokohama; Mamoru Nakamura, Takaoka; Takaharu Abe, Atsugi, all of Japan

[73] Assignees: Nippon Zeon Co. Ltd., Tokyo; Victor Company of Japan Limited, Kanagawa, both of Japan

[21] Appl. No.: 201,592

[22] Filed: Oct. 28, 1980

[30] Foreign Application Priority Data

Oct. 29, 1979 [JP] Japan .................. 54/139705

[51] Int. Cl.³ .............................................. H01B 1/06
[52] U.S. Cl. .................................. 252/511; 252/500; 252/512; 252/514; 358/128.5
[58] Field of Search ............ 252/500, 511, 512, 514; 260/23, 23 XA, 23 H, 23 CP, 37 M, 42, 42.22, 42.41; 358/128, 129

[56] References Cited

U.S. PATENT DOCUMENTS 3,833,541  9/1974  Shen .......................... 260/998.16
3,960,790  6/1976  Khanna ...................... 260/33 XA
3,975,321  8/1976  Herberger .................. 260/998.16
4,151,132  4/1981  Khanna .

FOREIGN PATENT DOCUMENTS 53-116104 10/1978 Japan .
53-119017 10/1978 Japan .

Primary Examiner—Benjamin R. Padgett
Assistant Examiner—J. L. Barr
Attorney, Agent, or Firm—Sherman & Shalloway

[57] ABSTRACT

An improvement is provided in and relating to a capacitance-type record medium wherein an information signal is recorded as a variation in the geometrical shape of its surface area, and is played back by the variation of the capacitance between its surface and an electrode of a reproducing stylus scanning the surface of the record medium relatively which occurs according to a variation in the geometrical shape of its surface area. The improvement consists in the fact that at least the surface area of the record medium is formed of (1) a material composed of an electrically conductive substance and a copolymer consisting of 98 to 65% by weight of vinyl chloride, 2 to 20% by weight of an alkyl vinyl ether with the alkyl group having 4 to 18 carbon atoms and-/or a vinyl ester of a fatty acid in which the fatty acid residue has 4 to 18 carbon atoms and 0 to 15% by weight of another monomer copolymerizable with these compounds, or (2) a material composed of an electrically conductive substance and a polymer mixture consisting of at least two polymers in which the proportions of the constituent monomers are the same as in the aforesaid copolymer.

15 Claims, No Drawings

INFORMATION SIGNAL RECORD MEDIUM OF THE CAPACITANCE TYPE

BACKGROUND OF THE INVENTION

1. Field of the Invention

This invention relates to an information signal record medium of the capacitance type. More specifically, this invention relates to an information signal record medium of the capacitance type having good stability properties wherein an information signal is recorded as a variation in the geometrical shape of its surface area, and is played back by utilizing a variation in the capacitance between its surface and an electrode of a scanning reproducing stylus, characterized in that at least the surface area of the record medium is formed of a material composed of an electrically conductive substance and a specified resin having good compatibility with it.

2. Description of the Prior Art

A so-called capacitance reproducing method has previously been known which comprises causing a reproducing stylus having an electrode to scan relatively a recording track of an information signal record medium having an information signal recorded on its flat surface or in a groove thereof as a variation in geometrical shape, thereby allowing the capacitance between the electrode of the reproducing stylus and the record medium to vary according to the variation in geometrical shape.

A conventional information signal record medium of the capacitance type used in this type of capacitance reproducing method is produced by adhering a thin metal film having a thickness of several hundred Å as an electrode for providing a capacitance between the electrode and an electrode of a reproducing stylus to the surface of a record medium substrate press-molded in a varying geometrical shape, and further adhering thereto a thin dielectric film having a thickness of several hundred Å in order to protect the thin metal film, to prevent short-circuiting between the electrodes, and to increase a dielectric constant between the electrodes. The production of the conventional information signal record medium of the capacitance type requires many process steps including a step of press-molding the substrate, a step of adhering the thin metallic film and a step of adhering the dielectric film. Hence, the manufacturing process is complex and requires large-sized manufacturing facilities. This necessarily leads to a very high cost of production.

An improved information signal record medium of the capacitance type which eliminates these defects was proposed in Japanese Laid-Open Patent Publication No. 119017/78. This record medium is produced by press-forming an electrically conductive plastic material composed of a vinyl chloride/vinyl acetate copolymer and a minor amount of carbon black as a conductive substance, whereby an information signal is recorded as a variation in geometrical shape. Since a capacitance is generated between the record medium and an electrode of a reproducing stylus, the step of adhering a thin metallic film essential in the prior art can be obviated. Furthermore, since the fine particles of carbon black themselves are coated with the resin, the step of adhering a dielectric film essential in the prior art can be omitted. Hence, the information signal record medium of the capacitance type can be produced very easily at a very low cost. The production of this record medium, however, has the disadvantage that because a friction which occurs between the carbon black particles and the resin molecules during the mixing of the vinyl chloride/vinyl acetate copolymer with carbon black produces a high internal heat, the copolymer is liable to undergo thermal decomposition during the processing. In addition, since the melt viscosity of the material is high because of the poor affinity between the carbon particles and the resin molecules, the material cannot be well molded by conventional molding facilities.

In order to overcome such disadvantages, it may be possible to increase the amount of a lubricant or plasticizer component to be incorporated into the resin. In such a case, however, new problems arise. For example, the record medium may be deformed when the atmospheric temperature rises even a little (namely, the environmental stability of the record medium is poor), and the performance of the record medium is reduced owing to the bleeding of the plasticizer, etc. (namely, the stability with time of the record medium is poor).

SUMMARY OF THE INVENTION

It is an object of this invention to provide a novel information signal record medium of the capacitance type which offers a solution to the aforesaid problems.

The object of this invention is achieved in accordance with this invention by forming at least the surface area of an information signal record medium of the capacitance type with the use of a material composed of an electrically conductive material and a copolymer (to be referred to as a vinyl-type PVC) consisting of 98 to 65% by weight of vinyl chloride, 2 to 20% by weight of an alkyl vinyl ether with the alkyl group having 4 to 18 carbon atoms and/or a vinyl ester of a fatty acid with the fatty acid residue having 4 to 18 carbon atoms and 0 to 15% by weight of another monomer copolymerizable with these compounds.

DETAILED DESCRIPTION OF THE INVENTION

In the electrically conductive material used in this invention, the alkyl group of the alkyl vinyl ether and the fatty acid residue (either saturated or unsaturated) of the vinyl ester of a fatty acid may be linear or branched, but should have 4 to 18 carbon atoms. If the number of carbon atoms is 3 or less, the processability of the resulting material is poor, and a molded article prepared from it becomes brittle. Generally, as the number of carbon atoms increases, there can be obtained a material having better processability, heat stability and flexibility. However, if the number of carbon atoms is 19 or more, the copolymerizability of the alkyl vinyl ether and the vinyl ester of a fatty acid with vinyl chloride or the other comonomer is reduced.

Examples of the alkyl vinyl ether include n-butyl vinyl ether, iso-butyl vinyl ether, octyl vinyl ether, lauryl vinyl ether and cetyl vinyl ether. Examples of the vinyl ester of a fatty acid are vinyl caproate, vinyl caprylate, vinyl laurate, vinyl stearate and vinyl oleate.

Examples of the other monomer which is an optional component copolymerizable with vinyl chloride, the alkyl vinyl ether and/or the vinyl ester of a fatty acid include olefins such as ethylene and propylene; vinyl esters of fatty acids having not more than 3 carbon atoms such as vinyl acetate; unsaturated carboxylic acids such as acrylic acid, methacrylic acid, maleic acid and fumaric acid; unsaturated carboxylic acid esters such as methyl acrylate; unsaturated carboxylic acid anhydrides such as maleic anhydride; nitrile compounds such as acrylonitrile; alkyl vinyl ethers having not more than 3 carbon atoms such as methyl vinyl ether; and vinylidene compounds such as vinylidene chloride.

Instead of the aforesaid vinyl-type PVC, a polymer mixture prepared by mixing at least two polymers such that the proportions of the constituent monomers are the same as in the aforesaid vinyl-type PVC can be used. More specifically, this polymer mixture (to be referred to as a vinyl-type PVC mixture) is prepared by mixing at least two polymers such that the final mixture contains 98 to 65% by weight of vinyl chloride, 2 to 20% by weight of an alkyl vinyl ether with the alkyl group having 4 to 18 carbon atoms and/or a vinyl ester of a fatty acid with the fatty acid residue having 4 to 18 carbon atoms and 0 to 15% by weight of another monomer copolymerized with at least one of these compounds. The vinyl-type PVC mixture, for example, means a mixture consisting of a homopolymer of Vinyl chloride, or a copolymer of vinyl chloride and a monomer (e.g., monomers cited above as the comonomer of the vinyl-type PVC) copolymerizable therewith and a copolymer of an alkyl vinyl ether and/or a vinyl ester of a fatty acid and a monomer copolymerizable therewith (e.g., vinyl chloride, an olefin, a vinyl ester, an unsaturated carboxylic acid or its derivatives, acrylonitrile, vinylidene chloride, etc.). In short, it can be prepared by mixing at least two polymers such that the proportions of the monomeric components constituting the polymer mixture are the same as specified above.

The proportion of the alkyl vinyl ether and/or the vinyl ester of a fatty acid in the aforesaid vinyl-type PVC or vinyl-type PVC mixture is 2 to 20% by weight. If the proportion is less than 2% by weight, not only are the processability and mechanical properties, especially toughness, of the resulting material inferior, but also an information signal recorded in the resulting material is difficult to play back stably. If, on the other hand, it exceeds 20% by weight, the softening temperature of the copolymer decreases inconveniently.

The proportion of the other monomer in the aforesaid vinyl-type PVC or vinyl-type PVC mixture is 0 to 15% by weight. If it exceeds 15% by weight, one or both of the mechanical properties and heat stability during processing of the material are degraded.

Vinyl chloride is used in a proportion of 98 to 65% by weight according to the proportions of the aforesaid components.

Examples of the electrically conductive substance to be blended with the vinyl-type PVC or vinyl-type PVC mixture are carbon black and fine powders of metals such as silver, copper and aluminum. In order that an information signal record medium obtained by molding a material composed of the vinyl-type PVC or vinyl-type PVC mixture and the conductive substance can permit good capacitance-type reproduction, it is necessary that the molded record medium should have a specified direct-current volume resistivity (to be referred to simply as volume resistivity).

Generally, when a fine powder of a conductive substance is fully mixed with a resin, in order for the resulting material to show some degree of conductivity, the fine particles should be spaced from each other by a distance smaller than a certain point (for example, less than about 100 Å), or should contact each other. This is widely known from publications dealing with an electron tunnel effect, the conducting mechanism of electrically conductive materials, etc.

Specifically, in order to perform capacitance-type reproduction in good condition using the resulting information signal record medium of the capacitance type, the record medium should have a volume resistivity of 0.5 ohm.cm to about 1 kiloohm·cm. If the amount of the conductive substance to be blended is too small, the volume resistivity of the resulting record medium becomes so high that good capacitance reproduction cannot be performed. When the volume resistivity of the record medium is decreased by increasing the amount of the conductive substance, the ability of the record medium to permit capacitance-type reproduction does not increase infinitely, and at a volume resistivity below a certain limit, the reproducing ability no longer increases and the record material becomes brittle. In other words, the excessively large amount of the conductive substance is not practical.

Accordingly, the conductive substance is blended in an amount of 10 to 60 parts by weight per 100 parts by weight of the vinyl-type PVC or the vinyl-type PVC mixture so that the volume resistivity falls within the aforesaid range. This is substantially the same whether the conductive substance is carbon black or a metal powder.

Since the material obtained by blending the conductive substance with the vinyl-type PVC or the vinyl-type PVC is molded at a relatively high temperature (e.g., more than 130° C.), it is preferred to add to the material the same additives as used in general vinyl chloride resins, such as stabilizers and lubricants. Plasticizers may also be incorporated. Silicone-type or fluorine-containing lubricants may be incorporated in order to prevent abrasion of the reproducing stylus. It is not necessary however to use the aforesaid lubricants, plasticizers, etc. in so large an amount which may impair the stability of the resulting molded articles because the resin particles of the vinyl-type PVC or the vinyl-type PVC mixture have excellent affinity for the particles of the conductive substance. Accordingly, the problems which reside with the record medium proposed in Japanese Laid-Open Patent Publication No. 119017/78 cited above do not arise in the present invention.

In order to improve the processability, mechanical properties (particularly brittleness) and electrical properties of the resulting material, there may be incorporated an elasticity-imparting polymer such as an acrylonitrile/butadiene rubber, thermoplastic polyurethane, an ethylene/vinyl acetate copolymer, a graft copolymer of an ethylene/vinyl acetate copolymer having vinyl chloride grafted thereto, a methyl methacrylate/butadiene/styrene type resin and a chlorinated polyolefin, or a processability improving polymer such as a copolymer composed of methyl methacrylate as a major unit. The amount of such a polymer is, for example, 0 to 30 parts by weight per 100 parts by weight of the vinyl-type PVC or the vinyl-type PVC mixture.

The aforesaid conductive substance and the various additives may be mixed with the vinyl-type PVC or the vinyl-type PVC mixture during processing by a ribbon blender, a Bunbury mixer, a high-speed agitator, etc. Or they may be fed together with the monomers into a polymerization reactor at the time of manufacturing the vinyl-type PVC. Alternatively, they may be added to a slurry of the vinyl-type PVC or vinyl-type PVC mixture prior to drying. The resulting material preferably has a melt viscosity of $3 \times 10^3$ to $30 \times 10^3$ poises at a temperature of 160° C. and a shearing speed of $10^3$ sec$^{-1}$ for ease of molding.

The following Examples are given to illustrate materials used to produce video disks having a video signal as an example of the information signal record medium of the capacitance type.

In these Examples, all parts and percentages are by weight.

The various properties of the materials were measured by the following methods.

MELT VISCOSITY

The melt viscosity of a square-shaped pellet specimen with each side measuring 5 mm was measured at a temperature of 160° C. and a shearing speed of $10^3$ sec$^{-1}$ using a Koka-type flow tester with a nozzle 10 mm in length and 1 mm in diameter.

DYNAMIC HEAT STABILITY

Using a Brabender plastograph, 68 g of square-shaped pellets with each side measuring 5 mm were charged into a chamber of the plastograph having a capacity of 60 cc and maintained at a temperature of 170° C. at a main shaft rotating speed of 60 rpm and a rotor rotating ratio of 2:3. The specimen was pre-heated for 3 minutes, and then rotated. The time (minutes) which run from this point to the time when a Congo red test paper wetted with glycerol and placed about 3 cm above the charge opening of the chamber was colored by hydrogen chloride gas generated by decomposition was measured. This time was recorded as the decomposition time which is a measure of dynamic heat stability. A material which has a decomposition time of less than 20 minutes is undesirable because it may undergo decomposition depending upon the molding conditions.

RIGIDITY

Measured by an Olsen stiffness tester with a weight of 5 in-lb and a span of ¼ inch in accordance with ASTM D-747. The specimen used was a piece, 1 cm×3 cm×0.1 cm, cut out from a plate obtained by press-forming square-shaped pellets with each side measuring 5 mm by means of a 75-ton press. The bending angle should be at least 10 degrees, preferably at least 20 degrees. A material having a bending angle of less than 10 degrees gives a disk which is liable to break when it is removed from the molding machine, and also when the disk after molding is subjected to a burr-removing step.

REPRODUCTION C/N

The ratio of the output of the synchtip of a synchronizing signal in a reproduced video signal to the residual noise at 2 MHz was determined when reproducing the disk by a reproducer. It is expressed in dB.

VOLUME RESISTIVITY

A rectangular specimen, 1.5 cm×8 cm, was cut out from the resulting disk in its diametrical direction, and a silver paint was coated in a width of 5 mm on both ends of the specimen to provide electrodes. The current between the electrodes was measured by a galvanometer. The volume resistivity was calculated in accordance with the following equation using the direct-current resistance value obtained.

$$\text{Volume resistivity (ohms.cm)} = \text{Resistance (ohms)} \times \frac{\text{width (cm)} \times \text{thickness (cm)}}{\text{length (cm)}}$$

REPRODUCTION STABILITY

The signal of the resulting disk was played back by a reproducer, and it was determined whether the reproduction could be performed wihout serious troubles such as the short-term interruption of the reproduced signal owing to the skipping of the reproducing stylus or the rising of the recording stylus due to the waste from the disk, and whether the reproduction could be performed stably in a stationary image reproducing mode. The results were evaluated on a scale of ○ which represents "good," Δ which represents "fair," and x which represents "poor."

ENVIRONMENTAL STABILITY

The specimen was allowed to stand for 24 hours in an atmosphere kept at a temperature of 35° C. and a relative humidity of 80%. Then, the signal recorded in it was played back to see whether the reproduction could be performed stably. The results were evaluated on a scale of ○ which represents "good," Δ which represents "fair," and X which represents "poor."

HEAT STABILITY

The disk was allowed to stand for 3 hours in an atmosphere kept at 45° C. after molding, and it was determined to what extent the disk was deformed. The results were evaluated on a scale of ○ which represents "good," Δ which represents "fair," and X which represents "poor."

EXAMPLE 1

One hundred parts of a copolymer composed of 90% of vinyl chloride and 10% of cetyl vinyl ether, 2.5 parts of dibutyltin dilaurate as a stabilizer, 0.5 part of epoxidized soybean oil, 0.5 part of dimethylpolysiloxane as a lubricant and 2 parts of Wax E (a trademark for a product of Hoechst AG, West Germany) as a slip agent were fully stirred in a Henschel mixer. Then, 20 parts of Ketjen Black EC (a trademark for carbon black made by Akzo Chemie, Netherlands; average particle diameter about 30 mμ) was added, and the mixture was fully stirred. The fully stirred materials were kneaded for about 10 minutes on an 8-inch open roll. The surface temperature of the roll at this time was 150° C. After kneading, a sheet-like material was cut out from the resulting product, and converted to pellets with each side measuring 5 mm. Some of the pellets were used as specimens for testing the melt viscosity, dynamic heat stability and rigidity of the material, and the remainder was passed through an extruder and pre-molded. The temperature of the extruder was 160° C. The pre-molded material was molded by a compression-molding machine in which a video disk stamper was secured to a die under a pressure of 140 kg/cm$^2$ for a molding cycle of 60 seconds to form a video disk. The video disk as obtained was subjected to a reproducer, and the reproduction C/N was measured. The volume resistivity, reproduction stability, environmental stability and dynamic heat stability of the video disk were measured. The data obtained are shown in Table 1.

EXAMPLE 2

The procedure of Example 2 was repeated except as noted below. The amount of carbon black was changed to 15 parts (Example 2a) and to 25 parts (Example 2b). In other runs, the carbon black was changed to Vulcan CSX-99 (a trademark for a product of Cabot Corporation, U.S.A.; average particle diameter about 13 m$\mu$), and its amount was adjusted to 30 parts (Example 2c), 40 parts (Example 2d) and 50 parts (Example 2e).

The results obtained are shown in Table 1.

It is seen from the data given in Table 1 that even when carbon black is mixed in an amount above a certain limit, the good processability of the material and the good properties of the disk in reproduction do not change.

passed through an extruder with the same recipe as in Example 1, and the material was likely to decompose during processing. Accordingly, 5 parts of dioctyl phthalate as a plasticizer was added to the recipe of Example 1 as follows:

| | |
|---|---|
| Polymer | 100 parts |
| Dibutyltin dilaurate | 2.5 parts |
| Epoxidized soybean oil | 0.5 part |
| Dimethylpolysiloxane | 0.5 part |
| Wax E | 2.0 parts |
| Dioctyl phthalate | 5.0 parts |
| Ketjen Black EC | 20 parts |

The results are shown in Table 2.

TABLE 2

| | | Run | | | | | | | |
|---|---|---|---|---|---|---|---|---|---|
| | | Invention | | | | Comparison | | | |
| Items of evaluation | | a | b | c | d | e | f | g | h |
| Polymer composition (wt. %) | Vinyl chloride | 97 | 89 | 82 | 80 | 100 | 77 | 90 | 95 |
| | Cetyl vinyl ether | 3 | 11 | 18 | 7 | — | 23 | — | — |
| | Vinyl acetate | — | — | — | 13 | — | — | 10 | — |
| | Propylene | — | — | — | — | — | — | — | 5 |
| | Specific viscosity of polymer (JIS K-6721) | 0.248 | 0.220 | 0.197 | 0.182 | 0.305 | 0.175 | 0.203 | 0.200 |
| Processing characteristics | Melt viscosity (× 10³ poises) | 11.4 | 8.3 | 5.5 | 9.0 | 14.1 | 3.4 | 11.1 | 11.9 |
| | Dynamic heat stability (minutes) | 32 | >40 | >40 | 28 | >40 | >40 | 11 | 38 |
| | Rigidity (degrees) | 28 | >60 | >60 | 45 | 13 | >60 | 18 | 8 |
| Properties of the disk | Reproduction C/N (dB) | 34 | 38 | 38 | 36 | 34 | 30 | 32 | 32 |
| | Volume resistivity (ohms-cm) | 3.0 | 2.8 | 3.0 | 3.1 | 4.2 | 2.6 | 3.3 | 4.5 |
| | Reproduction stability | | | | | X | X | Δ | X |
| | Environmental stability | | | | Δ | X | X | X | Δ |
| | Heat stability | | | | Δ | X | X | X | |

TABLE 1

| | | Example | | | | | |
|---|---|---|---|---|---|---|---|
| Items of evaluation | | 1 | 2a | 2b | 2c | 2d | 2e |
| Carbon black | Type | Ketjen Black EC | Ketjen Black EC | Ketjen Black EC | Vulcan CSX-99 | Vulcan CSX-99 | Vulcan CSX-99 |
| | Amount (parts) | 20 | 15 | 25 | 30 | 40 | 50 |
| Processing characteristics | Melt viscosity (× 10³ × poises) | 6.6 | 4.1 | 8.7 | 9.2 | 12.9 | 16.8 |
| | Dynamic heat stability (minutes) | >40 | >40 | 36 | 32 | 28 | 24 |
| | Rigidity (degrees) | >60 | >60 | 48 | 41 | 33 | 26 |
| Properties of the disk | Reproduction C/N (dB) | 36 | 32 | 36 | 32 | 36 | 36 |
| | Volume resistivity (ohms.cm) | 1.7 | 79 | 0.9 | 420 | 10 | 4 |
| | Reproduction stability | | | | | | |
| | Environmental stability | | | | | | |
| | Heat stability | | | | | | |

EXAMPLE 3

The procedure of Example 1 was repeated except that the polymer composition was changed as shown in Table 2. The polymers in Runs e, g and h in Table 2 exhibited a high torque and a high heat generation when

EXAMPLE 4

The procedure of Example 1 was repeated except that the polymer composition was changed as shown in Table 3.

The results obtained are shown in Table 3.

TABLE 3

| | | Run No. | | | | | |
|---|---|---|---|---|---|---|---|
| | | Invention | | | | | Comparison |
| Items of evaluation | | a | b | c | d | e | f |
| Polymer composition (wt. %) | Vinyl chloride | 91 | 92 | 92 | 93 | 93 | 91 |
| | Isobutyl vinyl ether | 9 | — | — | — | — | — |
| | Octyl vinyl ether | — | 8 | — | — | — | — |
| | Cetyl vinyl ether | — | — | 8 | — | — | — |
| | Vinyl caproate | — | — | — | 7 | — | — |
| | Vinyl laurate | — | — | — | — | 7 | — |

TABLE 3-continued

| Items of evaluation | | Run No. Invention a | b | c | d | e | Comparison f |
|---|---|---|---|---|---|---|---|
| | Propyl vinyl ether | — | — | — | — | — | 9 |
| Specific viscosity of the polymer (JIS K-6721) | | 0.232 | 0.240 | 0.230 | 0.238 | 0.236 | 0.236 |
| Processing characteristics | Melt viscosity ($\times 10^3$ poises) | 11.9 | 10.6 | 9.8 | 10.8 | 9.6 | 13.2 |
| | Dynamic heat stability (minutes) | 23 | 38 | >40 | 36 | >40 | 8 |
| | Rigidity (degrees) | 30 | 33 | 47 | 32 | 42 | 13 |
| Properties of the disk | Reproduction C/N (dB) | 37 | 38 | 38 | 37 | 37 | 32 |
| | Volume resistivity (ohms-cm) | 2.8 | 2.7 | 3.1 | 3.3 | 2.8 | 3.5 |
| | Reproduction stability | Δ | | | | Δ | X |
| | Environmental stability | Δ | | | | Δ | Δ |
| | Heat stability | | | | | Δ | Δ |

EXAMPLE 5

The procedure of Example 3 was repeated except that a mixture consisting of 40 parts of the polymer of Run e and 60 parts of the polymer of Run f was used instead of using the polymer. The results obtained are shown in Table 4.

TABLE 4

| | | |
|---|---|---|
| Specific viscosity of the polymer mixture (JIS K-6721) | | 0.242 |
| Processing characteristics | Melt viscosity ($\times 10^3$ poise) | 7.7 |
| | Dynamic heat stability (minutes) | >40 |
| | Rigidity (degrees) | 52 |
| Properties of the disk | Reproduction C/N (dB) | 36 |
| | Volume resistivity (ohms-cm) | 3.0 |
| | Reproduction stability | |
| | Environmental stability | Δ |
| | Heat stability | Δ |

The information signal record medium of the capacitance type in accordance with this invention is not limited to the video disks described in the foregoing Examples, and may be a disk having PCM acoustic signals recorded therein, for example. It may be any information signal record medium in which the recorded signal can be played back by a variation in capacitance which occurs according to a variation in geometrical shape. Needless to say, the composition, blending recipe, etc. of the polymer are not limited to those shown specifically in the above Examples.

In the present invention, a material composed of an electrically conductive substance and the vinyl-type PVC or vinyl-type PVC mixture having the aforesaid composition is used to produce an information signal record medium of the capacitance type. Since the heat generated internally in this material during processing is not high, the resin is not likely to decompose under heat. Furthermore, because the affinity of the conductive substance with the resin molecules is good, the melt viscosity of the material is not so high, and it is not necessary to incorporate large amounts of lubricants, plasticizers, etc. into the material in order to reduce its melt viscosity. Consequently, according to the present invention, an information signal record medium of the capacitance type which can permit good capacitance reproduction with good dynamic heat stability, reproduction stability, environmental stability, heat stability, stability with time, etc. and a good reproduction C/N can be easily produced by utilizing conventional molding facilities.

What we claim is:

1. In an information signal record medium of the capacitance type wherein an information signal is recorded as a variation in the geometrical shape of its surface area, and is played back by the variation of the capacitance between its surface and an electrode of a reproducing stylus scanning the surface of the record medium relatively which occurs according to a variation in the geometrical shape of its surface area, the improvement wherein at least the surface area of the record medium is formed of a material composed of an electrically conductive substance and a copolymer consisting of 98 to 65% by weight of vinyl chloride, 2 to 20% by weight of an alkyl vinyl ether with the alkyl group having 4 to 18 carbon atoms and/or a vinyl ester of a fatty acid in which the fatty acid residue has 4 to 18 carbon atoms and 0 to 15% by weight of another monomer copolymerizable with these compounds.

2. The record medium of claim 1 wherein the alkyl vinyl ether is selected from the group consisting of n-butyl vinyl ether, iso-butyl vinyl ether, octyl vinyl ether, lauryl vinyl ether and cetyl vinyl ether.

3. The record medium of claim 1 wherein the vinyl ester of a fatty acid is selected from the group consisting of vinyl caproate, vinyl caprylate, vinyl laurate, vinyl stearate and vinyl oleate.

4. The record medium of claim 1 wherein the other monomer is selected from the group consisting of olefins, vinyl esters of fatty acids having not more than 3 carbon atoms, unsaturated carboxylic acids, unsaturated carboxylic acid esters, unsaturated carboxylic acid anhydrides, nitrile compounds, alkyl vinyl ethers having not more than 3 carbon atoms and vinylidene compounds.

5. The record medium of claim 1 wherein the electrically conductive substance is selected from the group consisting of carbon black and fine powders of silver, copper and aluminum.

6. The record medium of claim 1 wherein the amount of the electrically conductive substance is 10 to 60 parts by weight per 100 parts by weight of the copolymer.

7. The record medium of claim 1 wherein the material composed of the electrically conductive substance and the copolymer has a melt viscosity of $3 \times 10^3$ to $30 \times 10^3$ at a temperature of 160° C. and a shearing speed of $10^3$ sec$^{-1}$.

8. In an information signal record medium of the capacitance type wherein an information signal is recorded as a variation in the geometrical shape of its surface area, and is played back by the variation of the capacitance between its surface and an electrode of a reproducing stylus scanning the surface of the record medium relatively which occurs according to a variation in the geometrical shape of its surface area, the improvement wherein at least the surface area of the record medium is formed of a material composed of an electrically conductive substance and a polymer mixture of at least two polymers in which the proportions of the monomers constituting the polymer mixture are such that the mixture contains 98 to 65% by weight of vinyl chloride, 2 to 20% by weight of an alkyl vinyl ether with the alkyl group having 4 to 18 carbon atoms and/or a vinyl ester of a fatty acid with the fatty acid residue having 4 to 18 carbon atoms, and 0 to 15% by weight of another monomer copolymerized with at least one of these compounds.

9. The record medium of claim 8 wherein the alkyl vinyl ether is selected from the group consisting of n-butyl vinyl ether, isobutyl vinyl ether, octyl vinyl ether, lauryl vinyl ether and cetyl vinyl ether.

10. The record medium of claim 8 wherein the vinyl ester of a fatty acid is selected from the group consisting of vinyl caproate, vinyl caprylate, vinyl laurate, vinyl stearate and vinyl oleate.

11. The record medium of claim 8 wherein the other monomer is selected from the group consisting of olefins, vinyl esters of fatty acids having not more than 3 carbon atoms, unsaturated carboxylic acids, unsaturated carboxylic acid esters, unsaturated carboxylic acid anhydrides, nitrile compounds, alkyl vinyl ethers having not more than 3 carbon atoms and vinylidene compounds.

12. The record medium of claim 8 wherein the electrically conductive substance is selected from the group consisting of carbon black and fine powders of silver, copper and aluminum.

13. The record medium of claim 8 wherein the amount of the electrically conductive substance is 10 to 60 parts by weight per 100 parts by weight of the polymer mixture.

14. The record medium of claim 8 wherein the material composed of the polymer mixture and the electrically conductive substance has a melt viscosity of $3 \times 10^3$ to $30 \times 10^3$ at a temperature of 160° C. and a shearing speed of $10^3$ sec$^{-1}$.

15. The record medium of claim 8 wherein the polymer mixture consists of a homopolymer or copolymer of vinyl chloride and a copolymer of an alkyl vinyl ether and/or a vinyl ester of a fatty acid and a monomer copolymerizable therewith.

* * * * *